March 17, 1953  C. S. FRANCIS, JR  2,631,957
THREAD-REINFORCED FILMS AND METHODS OF MAKING THEM
Filed March 7, 1946
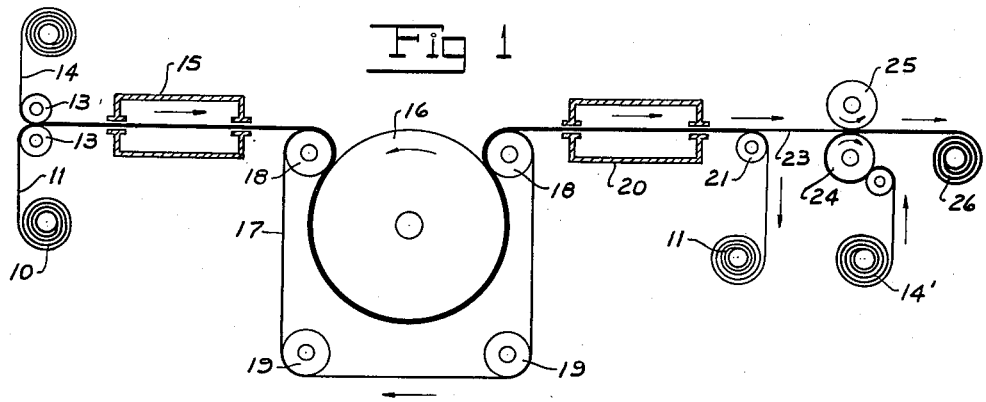
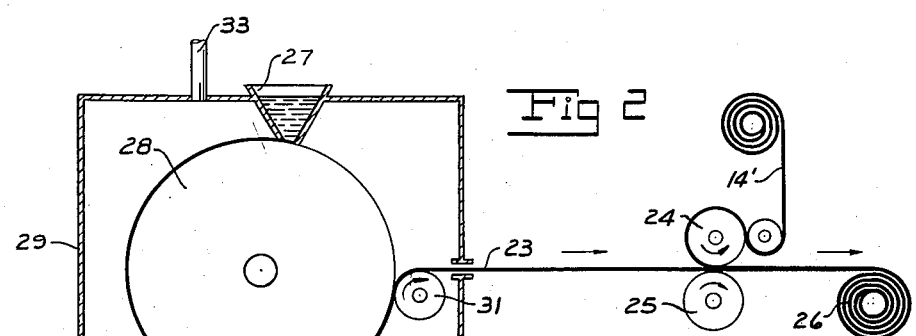
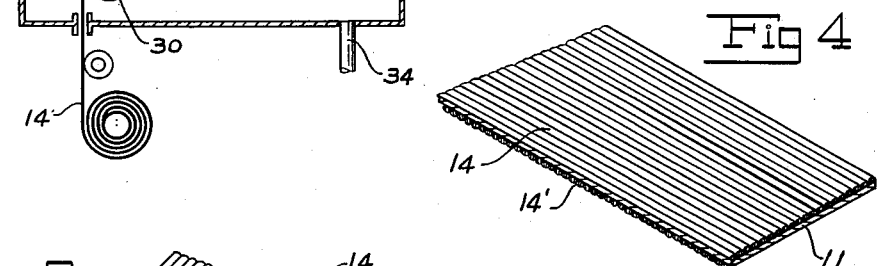
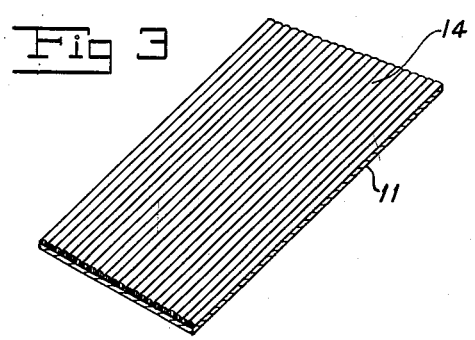
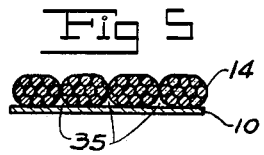
INVENTOR.
CARLETON S. FRANCIS JR.
BY
John Robert Janes
AGENT Patented Mar. 17, 1953

2,631,957

UNITED STATES PATENT OFFICE 2,631,957

THREAD-REINFORCED FILMS AND METHODS OF MAKING THEM

Carleton S. Francis, Jr., West Harwich, Mass., assignor, by mesne assignments, to American Viscose Corporation, Wilmington, Del., a corporation of Delaware Application March 7, 1946, Serial No. 652,826

8 Claims. (Cl. 154—92)

This invention relates to films of organic plastic material and more particularly to films which are distortionally stable in at least one direction.

Sheets or films formed of organic plastic materials are normally characterized by a smooth and glossy surface and a low degree of porosity. However, such films are equally distortable in all directions. Thermoplastic films particularly are dimensionally unstable and readily become more or less permanently distorted in various conditions of temperature and humidity.

Now, in accordance with this invention, films of a synthetic resin or a cellulose derivative are prepared that are distortionally stable in at least one direction. This has been accomplished by adhering a warp of parallel threads to a nonselfsupporting film in such a way that substantially no impregnation of the threads or of the spaces between the threads results, the film thereby becoming distortionally stable in the direction in which the threads run.

In the process of the invention a warp of unwoven parallel threads is brought into contact with a nonselfsupporting thermoplastic film of a synthetic resin or a cellulose derivative supported on a temporary backing sheet. Heat and/or pressure is applied to the assemblage to cause the threads to adhere to the films. The backing sheet is then stripped from the film. If desired, a second warp of unwoven parallel threads may then be adhered to the other surface of the nonselfsupporting thermoplastic film. Where the nature of the film material permits, the product may then be heated to convert the thermoplastic film to a nonthermoplastic state.

Thus, the product of the invention comprises a continuous film of organic plastic material having adhered to at least one surface a warp of unwoven parallel threads, the threads and the spaces between the threads being substantially free of the film material.

In the following specification and claims, the term "organic plastic material" is intended to cover any thermoplastic synthetic resinous material or organic cellulose compound. The term includes thermoplastic resins and thermosetting resins in a thermoplastic incompletely polymerized stage capable of being polymerized into an infusible nonthermoplastic stage. When referring to a "film adhered to a warp of unwoven parallel threads," the term also includes thermosetting resins in an infusible nonthermoplastic stage.

The drawings illustrate the product of the invention and various methods of its preparation.

Figure 1 is a diagrammatic representation in side elevation of an apparatus adapted to produce the dimensionally stable film of the invention.

Figure 2 is a diagrammatic representation in side elevation of another apparatus for carrying out the process of the invention which includes continuously forming the film.

Figure 3 is a perspective view of a film in accordance with the invention, having a warp of parallel threads adhered to one surface.

Figure 4 is a perspective view of a film in accordance with the invention, having a warp of parallel threads adhered to each of its surfaces, the threads in one warp running at right angles to the threads in the other warp.

Figure 5 is an enlarged view in cross-section of the product of the invention.

In the apparatus of Figure 1, a warp of unwoven parallel cotton threads 14 is brought into contact with a film 10 of a synthetic resin such as polyvinyl acetate supported on a temporary backing sheet 11 in the bite of the pressure rolls 13. The composite layers are passed through the heating chamber 15 in order to render the film of polyvinyl acetate tacky. The sheets are then subjected to heat and pressure by passing them around the heated drum 16. The tension rolls 18, together with the movable blanket 17, hold the assembled layers against the drum at a pressure between 25–50 lbs. per square inch. The drum is heated at a temperature of approximately 120° C. and revolved at such a rate that the time required for passage of the film around the drum is 10 seconds. The blanket 17 is formed of a heat-resistant infusible material and is kept tight by the passage around the adjustable tension rolls 19.

After passage about the drum, during the course of which the film 10 of polyvinyl acetate has become permanently adhered to the warp 14 of cotton threads, the assembled materials are cooled in the chamber 20 in order to render the film nontacky. The backing sheet 11 is then stripped from the film 10 by means of the stripping roll 21 and is rolled up.

The product 23, which comprises the film 10 to one surface of which has been adhered the warp of parallel threads 14, may then be rolled up or put to the use for which it is intended. If desired, a second warp of parallel threads may be adhered to the other surface of the film 10.

As shown in the drawing, the second warp of parallel cotton threads 14' is brought into contact with the exposed face of the film and adhered to it after preheating over the surface of the roll 24 by passage through the bite of the heated calender rolls 24 and 25. The finished product 26 having a warp of parallel threads on each surface, each of the warps running in the same direction, may then be rolled up or put to the use for which it is intended.

The apparatus of Figure 2 is designed to continuously form the film 10 on an endless support, thus avoiding the necessity of separately coating a temporary support as in the apparatus of Figure 1. The film-forming composition 27 is continuously coated upon a heated drum 28. The drum is enclosed in a chamber 29 through which heated air is passed by means of the entrance and exit pipes 33 and 34 respectively. The air carries off the solvents liberated in the drying of the film. By the time the film reaches the roller 30 it is in a nearly dry, tacky stage. At this point, a warp of parallel unwoven threads 14 is brought into contact with the film. The rolls 30 and 31 serve to hold the warp tightly against the film at a pressure between 25–50 lbs. per square inch. The drum 28 is heated at a temperature of approximately 125° C. and the time of passage of the warp over the surface of the drum is 10 seconds. By the time the warp has reached the stripping roll 31, the film has been permanently adhered to it without, however, substantial impregnation of the threads or the spaces between the threads of the film composition. The film is then stripped from the drum and the product 23 in accordance with the invention is obtained. This product is then ready for use.

If desired, a second warp of parallel threads may be adhered to the other surface of the film 10. This may be accomplished, as shown, by heating a warp 14' of parallel threads by passage over the surface of the roll 24 and then adhering it to the film in the bite of the calender rolls 24 and 25 by heat and pressure. The finished product 26 is then rolled up for storage or it may be put to its intended use.

Figure 3 shows the product 23 which may be obtained by the use of the apparatus of Figure 1 or Figure 2. The warp 14 of parallel threads is adhered to the film 10 in such a way that substantially no impregnation of the threads has resulted.

Figure 4 shows the product 26 which may be obtained by a slight modification of the apparatus of either Figure 1 and Figure 2. The film 10 is enclosed between two warps 14 and 14'. The threads in the warps run at right angles to each other thus making the product dimensionally stable in two directions.

Figure 5 is an enlarged view in cross-section of the product of Figure 3. The threads in the warp 14 are adhered to the film 10 on one face only. There is no impregnation of the spaces 35 between the individual threads nor is there any impregnation of the threads themselves. The film between the points of its adhesion to the individual threads and the sides of the threads between the points of their contact with each other and the point of their adhesion to the film define a space between them, the threads imparting distortional stability to the film and sufficient strength to make the film selfsupporting. Thus, the utmost flexibility is preserved in the final product.

The practice of this invention is illustrated in the following examples:

EXAMPLE I

A warp of parallel cotton threads was brought into contact with a film of polyvinyl chloride having a thermal tacking point of approximately 120° C. supported on a temporary backing sheet of paper having a smooth surface of a urea-formaldehyde resin in a nonthermoplastic state. The two sheets were adhered together at a pressure of 50 lbs. per square inch while the drum was heated at a temperature of 135° C. The threads were thereby adhered to the plastic sheet without impregnating them with the film composition. The backing sheet was removed from the film and the product was ready for use. The surface of parallel threads has the appearance of a ribbon, while the other surface of the product had the appearance of an unmodified selfsupporting film of polyvinyl chloride. The warp of parallel threads imparted sufficient strength to the polyvinyl chloride film to make it selfsupporting while at the same time making it distortionally stable in the direction in which the threads ran.

EXAMPLE II

A warp of parallel wool threads of a deep red color were brought into contact with a thin nonselfsupporting film of polyvinyl butyral having a thermal tacking point of 70° C. which had likewise been dyed a brilliant red color, and which was supported on a temporary backing sheet of waxed paper. The film and warp were adhered together by passing them about a drum heated to a temperature of 120° C., as illustrated in Figure 1. The passage time required 10 seconds, and the pressure exerted by means of the blanket was 25 lbs. per square inch. The film was thereby adhered to the warp of parallel wool threads without impregnating the threads with the film composition. The backing sheet was then stripped from the transfer film.

A thin film of wax adhered to the surface of the polyvinyl butyral. This was polished by passing the film over polishing rolls, giving the film a high gloss and improved moisture-imperviousness. The product had a distinctive appearance and when cut in strips was found to make excellent decorative material, useful in the same manner as ribbons.

EXAMPLE III

Example II was repeated except that the thermoplastic film supported on a temporary backing sheet was of Koroseal (polyvinyl chloride) which had a thermal tacking point of 100° C., and which had been dyed a light blue. The film and warp threads were adhered together at a temperature of 125° C., and a pressure of 100 lbs. per square inch.

EXAMPLE IV

A warp of unwoven parallel neoprene (polychloroprene) threads were adhered to a nonselfsupporting film of polyvinylidene chloride having a thermal tacking point of 160° C. supported on a temporary backing sheet according to the process illustrated in Figure 1. The temperature used was 200° C., the pressure 250 lbs. per square inch. and the time of passage 5 seconds. The resulting product was useful, neoprene face down, as a belt which was required to contact an oily surface. The neoprene layer increased the tensile strength of the polyvinylidene chloride film and made it distortionally stable in the direction in which the neoprene threads ran.

EXAMPLE V

A nonselfsupporting film of the copolymer of vinyl chloride and vinyl acetate having a thermal tacking point of 65° C., was formed on the film-casting drum of Figure 2. The film while still tacky was brought into contact with a warp of unwoven parallel Vinyon (copolymer of vinyl chloride and vinyl acetate) threads. The film and threads were adhered to each other by fusion, the drum being heated at a temperature of 70° C., and the pressure on the Vinyon threads being such as to thrust them against the film at a pressure of 25 lbs. per square inch. At this temperature, the Vinyon threads became slightly tacky and thus adhered firmly to the Vinyon films supported on the drum. The product was stripped from the drum, the surface of which had been waxed to facilitate stripping, the composite layers cooled, and the product was ready for use.

EXAMPLE VI

Example V was repeated using a warp of parallel threads formed of mixed wool and Vinyon fibers. The heat and temperature employed were the same. The Vinyon fibers improved the adhesion of the threads to the film.

EXAMPLE VII

A nonselfsupporting film of 75% polyvinyl butyral and 25% urea-formaldehyde resin was formed on an endless backing sheet, as illustrated in Figure 2. The film had a thermal tacking point of 80° C. While the film was still tacky, a warp of parallel cotton threads was brought into contact with it and thrust against it at a pressure of 150 lbs. per square inch by the tension rolls. The drum was heated at a temperature of 80° C. and the time of passage over the drum was 15 seconds. The polyvinyl butyral urea-formaldehyde resin film was then stripped from the casting surface. The resulting product was heated at 135° C. for one-half hour in order to complete the polymerization of the urea-formaldehyde resin to a nonthermoplastic stage.

EXAMPLE VIII

Example VII was repeated using as the film-forming composition, a thermosetting urea-formaldehyde resin in a thermoplastic stage having a tacking point of 100° C. The warp of parallel cotton threads was adhered to the film at a pressure of 80 lbs. per square inch and a temperature of 130° C. for a passage time of 10 seconds. The film was then converted to a nonthermoplastic stage as described.

EXAMPLE IX

A warp of parallel glass threads were coated with Silastic SC (silicone rubber) coating, a smooth white paste having the consistency of a heavy ointment. The coated glass threads were then brought into contact with a film of Silastic SC resin supported on a temporary backing sheet. The film was in a tacky state. The film and coated glass threads were passed around a heated drum as illustrated in Figure 1, the backing sheet being against the surface of the drum and the coated glass threads being on the outer surface of the composite layers. The drum was heated at a temperature of 125-150° C. and the pressure exerted was 100 lbs. per square inch. The passage time around the drum was one minute. During the passage, the glass threads were firmly adhered to the Silastic SC film and the film itself cured to a nontacky stage. The assembled layers were then stripped from the drum and then cooled, the backing sheet was stripped from the film, and the product ready for use. Where complete curing of the Silastic SC film is not possible in such a short time, the product may be heated at 125-150° C. until polymerization is complete and the coating nontacky. Curing is preferably done in the presence of an inert atmosphere of nitrogen.

The product has extraordinary heat-resistance while the glass threads impart distortional stability and tensile strength to the Silastic SC film. The product may be employed as a belt where high temperatures are necessary.

EXAMPLE X

A hot melt cellulose acetate butyrate composition (Tenite II 215K-16421-V9500) was coated upon the film-casting surface of the drum in Figure 2. The temperature of the drum was held at 130° C. so that the hot melt cooled to form a tacky film. A warp of parallel cotton threads was then adhered to the tacky cellulose acetate butyrate film by passage around the drum at a pressure of 175 lbs. per square inch and a passage time of eight seconds. The film was stripped from the drum, the surface of which had been waxed to prevent permanent adhesion of the cellulose acetate butyrate film, and the product was ready for use.

A warp of parallel nylon threads was brought into contact with a nonselfsupporting film formed of polyvinyl butyral having a thermal tacking point of 75° C. and supported on an endless metal band. The warp and film were adhered together by passage through a pair of calender rolls, the calender rolls being adjusted to exert a pressure of 75 lbs. per square inch and a temperature of 80° C. The composite layers were cooled to render the resin film nontacky and the backing sheet then stripped. The nylon threads were permanently adhered to the polyvinyl butyral resin film increasing the tensile strength of the film and preventing its distortion in the direction in which the nylon thread ran.

The warp of unwoven parallel threads may include all types and classes of threads including natural and artificial threads. Likewise, modified natural threads may be employed, such as threads coated or impregnated by a cellulose compound or a thermoplastic synthetic resin. Thus, there may be employed:

*Natural threads*

| | |
|---|---|
| Cotton | Silk |
| Hemp | Wool |
| Jute | Hair |
| Flax | Fur |
| Kapok | Animal |
| Leather | Asbestos |

*Artificial threads*

| | |
|---|---|
| Glass | Zein |
| Rock wool | Viscose rayon |
| Casein | Acetate rayon |
| Gelatin | |

The warp may also be composed of threads formed in whole or part of a thermoplastic resin having a thermal tacking point the same as, or higher or lower than the thermal tacking point of the organic plastic film and adhesively compatible with the film. Thus, threads may be treated to render them adhesive by subjecting them to the action of a solvent, hot air, steam, heated plates or rollers, with or without pressure. Thermoplastic threads which may be employed include:

Thermoplastic resin threads

Polyvinyl chloride
Polyvinylidene chloride
Polystyrene
Copolymers of vinyl chloride and vinyl acetate
Polyethylene
Polyamides
Natural rubbers
Synthetic rubbers

Thermoplastic cellulose compound threads

Cellulose acetate
Cellulose acetate butyrate
Ethyl cellulose

For the homogeneous film used as the continuous layer in the sheet material of the invention, there is employed a film or pellicle formed of a thermoplastic synthetic resin or a thermoplastic cellulose compound as a class. The term "thermoplastic synthetic resin" is intended to include permanently thermoplastic resins and thermosetting heat-hardenable resins in an incompletely polymerized thermoplastic stage. Among the thermoplastic resins and cellulose derivatives there may be employed:

Thermoplastic resins

Polyvinyl chloride
Polyvinylidene chloride
Polystyrene
Copolymers of vinyl chloride and vinyl acetate
Copolymers of methyl methacrylate and vinyl chloride
Polyvinyl butyral
Polyvinyl acetal
Polymethyl methacrylate
Polymethyl acrylate
Polyethylene
Polyamides
Coumarone-indene with rubber
Oil-modified and unmodified alkyd resins (prepared from dihydroxy alcohols and dicarboxylic acids)
Phenol-formaldehyde resins (prepared from phenols having only two reactive positions)

Thermoplastic cellulose compounds

Cellulose acetate
Cellulose acetate butyrate
Cellulose acetate propionate
Cellulose propionate
Benzyl cellulose
Ethyl cellulose
Butyl cellulose
Hydroxy ethyl cellulose

Thermosetting resins in a thermoplastic stage

Urea-formaldehyde
Urea alcohol ether formaldehyde
Phenol-formaldehyde (phenols having three reactive positions)
Alkyd resins (prepared from polyhydric alcohols and polycarboxylic acids)
Melamine-formaldehyde
Aniline-formaldehyde
Phenol-furfural
Unsaturated polyesters
Polyallyl alcohol and derivatives
Protein-formaldehyde resins:
    Casein-formaldehyde
    Shellac-formaldehyde

Mixtures of thermoplastic and thermosetting resins

Polyvinyl chloride and urea-formaldehyde-butanol ether
Polyvinyl chloride and phenol-formaldehyde
Polymethylmethacrylate and urea-formaldehyde
Polystyrene and alkyd
Coumarone-indene and alkyd
Polyvinyl acetal and melamine-formaldehyde
Polyvinyl butyral and urea-formaldehyde Synthetic resins are preferably used for the thermoplastic film because they are superior to cellulose derivatives. Compared with cellulose derivatives the synthetic resins used in the present invention are more water-resistant, and more resistant to decomposition by salt water, alkalies, acids, sunlight, and heat, and stronger and tougher for films of equal thickness.

It is preferred to employ nonselfsupporting films which are normally less than one mil thick, since these films provide substantially the same degree of imperviousness and protection as a selfsupporting film while possessing the advantages of lighter weight and lower cost. Moreover, mats and webs having a nonselfsupporting film adhered to one surface have better drape and are more flexible.

The film may be formed by extruding or casting a solution or molten mass of the synthetic resin in a suitable manner, or by calendering a plastic mass of the resin into a film. Alternatively, the synthetic resin, in solution or molten, may be applied to a temporary backing sheet to which the film shows no tendency for permanent adhesion and from which it can be readily stripped as a continuous film. This method of producing the film on the temporary backing sheet has certain advantages over extruding or casting the film since thinner films can thus be produced than by the latter methods.

In producing the sheet material of the invention, the warp of unwoven parallel threads and the film of organic plastic material are subjected to sufficient heat and pressure for a sufficient period to cause the film to adhere permanently to the surface of the thread without, however, causing impregnation of the warp of the plastic material.

The exact temperature employed will, of course, depend upon the thermal tacking point of the transfer film. It will, however, be between the thermal tacking temperature and within 50° C. higher than that temperature. In any event, it must not be so high that the film becomes fluid and flowable; likewise, the film must not have a viscosity so low that impregnation of the threads to a substantial extent occurs.

Under these conditions of temperature, the pressure should be between 25 and 300 pounds per square inch. It must be regulated carefully, and preferably should be as low as possible so as to prevent forcing of the threads through the film. In the preferred finished product, the film should be substantially as thick where it contacts the threads as where it spans the spaces between the threads.

Following lamination, the temporary backing sheet is then stripped off.

Where the sheet is formed of a thermosetting resin in a thermoplastic stage, the composite laminate may then be heated or otherwise treated to advance or complete polymerization of the resin to an infusible nonthermoplastic stage.

Thus, it is possible by a proper selection of sheet materials to prepare either thermoplastic or nonthermoplastic products.

To facilitate the adhesion between the threads and the film, the threads may be softened with a solvent or swelling agent for the film and/or the threads, whereupon, during the application of heat and pressure, the swollen or softened materials adhere more readily. The threads may be impregnated or coated with a plasticizer, either volatile or nonvolatile, as desired, which will facilitate the adhesion by lowering the thermal tacking point of any thermoplastic material in the combination, and, if nonvolatile, will increase the flexibility and softness of the final product.

The invention contemplates in a preferred embodiment that at least some, or all, of the threads may be formed in whole or in part of a thermoplastic material or of a thermosetting material in the thermoplastic state, whereupon, during the application of heat and pressure, the thermoplastic threads adhere and coalesce with the continuous film and also bind the threads together. However, the heat and pressure should be regulated so that the thermoplastic threads do not lose their fibrous form during the coalescing operation. By the use of thermoplastic threads, superior bonding of the layer to the film is obtained.

It is to be understood that various changes may be made in the product of the invention. For example, the film and the threads may be colored with either the same or a different color. Likewise, the film and/or the threads may be compounded with moistureproofing agents or with any desirable agents for rendering the finished sheet repellant to mildew, or with fireproofing agents, germicidal agents, and the like, for special purposes. Further, the film may be embossed or printed before, during, or after being combined with the warp of parallel threads. Where the continuous film has an objectionably smooth and glossy surface, it may be roughened by sandblasting to give it a dull matte finish. On the other hand, the surface of the film may be flocked with short threads to provide a suede-like appearance.

Having described my invention, what I claim as new and desire to secure by Letters Patent is:

1. A selfsupporting composite fabric having distortional stability in at least one direction comprising a nonselfsupporting film of organic plastic material less than 1 mil thick, a warp of unwoven parallel threads in contact with each other and adhered to one surface of the film along spaced generally parallel lines of adhesion, each of the threads comprising a plurality of fibers or filaments twisted together and being substantially unimpregnated and free of the film material except adjacent the adhesions, said threads comprising an organic plastic material and said fabric having generally parallel interstitial spaces between the lines of adhesion of adjacent threads to the film, in which each of the threads is adhered to the adjacent threads.

2. A selfsupporting composite fabric having distortional stability in at least one direction comprising a nonselfsupporting film of organic plastic material less than 1 mil thick, a warp of unwoven parallel threads in contact with each other and adhered to one surface of the film along spaced generally parallel lines of adhesion, each of the threads comprising a plurality of fibers or filaments twisted together and being substantially unimpregnated and free of the film material except adjacent the adhesions, said threads comprising an organic plastic material and said fabric having generally parallel interstitial spaces between the lines of adhesion of adjacent threads to the film in which each of the threads is adhered to the adjacent threads, in which the threads and the film both comprise a synthetic thermoplastic resin material.

3. The process of preparing a selfsupporting composite fabric having distortional stability in at least one direction comprising a nonselfsupporting film of organic plastic material less than 1 mil thick, a warp of unwoven parallel threads in contact with each other and adhered to one surface of the film along spaced generally parallel lines of adhesion, each of the threads comprising a plurality of fibers or filaments twisted together and being substantially unimpregnated and free of the film material except adjacent the adhesions, said threads comprising an organic plastic material and said fabric having generally parallel interstitial spaces between the lines of adhesion of adjacent threads to the film, which process comprises adhering by heat and pressure a warp of unwoven parallel threads to a nonselfsupporting film of organic plastic material supported on a temporary backing sheet, cooling the assembled layers, and then stripping the backing sheet from the film.

4. The process of preparing a selfsupporting composite fabric having distortional stability in at least one direction comprising a nonselfsupporting film of organic plastic material less than 1 mil thick, a warp of unwoven parallel threads in contact with each other and adhered to one surface of the film along spaced generally parallel lines of adhesion, each of the threads comprising a plurality of fibers or filaments twisted together and being substantially unimpregnated and free of the film material except adjacent the adhesions, said threads comprising an organic plastic material and said fabric having generally parallel interstitial spaces between the lines of adhesion of adjacent threads to the film, which process comprises contacting a warp of unwoven parallel threads to a tacky film attached to a temporary support, subjecting the film and threads to heat and pressure to permanently adhere the threads to the film, cooling the film to render it non-tacky, and stripping the support from the film.

5. The process of forming a selfsupporting composite fabric having distortional stability in at least one direction comprising a nonselfsupporting film of organic plastic material less than 1 mil thick, a warp of unwoven parallel threads in contact with each other and adhered to one surface of the film along spaced generally parallel lines of adhesion, each of the threads comprising a plurality of fibers or filaments twisted together and being substantially unimpregnated and free of the film material except adjacent the adhesions, said threads comprising an organic plastic material and said fabric having generally parallel interstitial spaces between the lines of adhesion of adjacent threads to the film, which process comprises contacting a film of a thermosetting resin in a thermoplastic stage attached to a temporary support with a warp of unwoven parallel threads, subjecting the film and warp to heat and pressure to permanently adhere the threads to the film, completing the polymerization of the resin to a non-thermoplastic stage, and stripping the support from the film.

6. The process of forming a selfsupporting composite fabric having distortional stability in at least one direction comprising a nonselfsupporting film of organic plastic material less than 1 mil thick, a warp of unwoven parallel threads in contact with each other and adhered to one surface of the film along spaced generally parallel lines of adhesion, each of the threads comprising a plurality of fibers or filaments twisted together and being substantially unimpregnated and free of the film material except adjacent the adhesions, said threads comprising an organic plastic material and said fabric having generally parallel interstitial spaces between the lines of adhesion of adjacent threads to the film, which process comprises contacting a film of a thermosetting resin in a thermoplastic stage attached to a temporary support with a warp of unwoven parallel threads, subjecting the film and threads to heat and pressure to permanently adhere the film to the threads, stripping the support from the film and continuing the polymerization of the film to a nonthermoplastic stage.

7. The process of forming a selfsupporting composite fabric having distortional stability in at least one direction comprising a nonselfsupporting film of organic plastic material less than 1 mil thick, a warp of unwoven parallel threads in contact with each other and adhered to one surface of the film along spaced generally parallel lines of adhesion, each of the threads comprising a plurality of fibers or filaments twisted together and being substantially unimpregnated and free of the film material except adjacent the adhesions, said threads comprising an organic plastic material and said fabric having generally parallel interstitial spaces between the lines of adhesion of adjacent threads to the film, which process comprises adhering a warp of unwoven parallel threads to a surface of a nonselfsupporting film of organic plastic material supported on a temporary backing sheet by heat and pressure, cooling the film to render it nontacky, stripping the backing sheet from the film, and adhering a second warp of unwoven parallel threads to the other surface of the film by heat and pressure.

8. The process of forming a selfsupporting composite fabric having distortional stability in at least one direction comprising a nonselfsupporting film of organic plastic material less than 1 mil thick, a warp of unwoven parallel threads in contact with each other and adhered to one surface of the film along spaced generally parallel lines of adhesion, each of the threads comprising a plurality of fibers or filaments twisted together and being substantially unimpregnated and free of the film material except adjacent the adhesions, said threads comprising an organic plastic material and said fabric having generally parallel interstitial spaces between the lines of adhesion of adjacent threads to the film, which process comprises fusing a warp of unwoven parallel thermoplastic threads to a nonselfsupporting film of organic plastic material supported on a temporary backing sheet by heat and pressure, cooling the film to render it nontacky, and stripping the temporary backing sheet from the film.

CARLETON S. FRANCIS, JR.

REFERENCES CITED

The following references are of record in the file of this patent:

UNITED STATES PATENTS

| Number | Name | Date |
|---|---|---|
| 1,512,096 | Hopkinson | Oct. 21, 1924 |
| 2,055,821 | Hansen et al. | Sept. 29, 1936 |
| 2,314,998 | Lessig | Mar. 30, 1943 |
| 2,332,233 | Katz | Oct. 19, 1943 |
| 2,344,457 | Christ | Mar. 14, 1944 |
| 2,364,607 | Dreher | Dec. 12, 1944 |
| 2,415,023 | Novotny | Jan. 28, 1947 |
| 2,422,969 | Johns | June 24, 1947 |
| 2,429,397 | Compton | Oct. 21, 1947 |

FOREIGN PATENTS

| Number | Country | Date |
|---|---|---|
| 17,549 | Great Britain | Aug. 15, 1898 |